United States Patent [19]

Tunison, III

[11] Patent Number: 5,342,597
[45] Date of Patent: Aug. 30, 1994

[54] PROCESS FOR UNIFORMLY MOISTURIZING FUMED SILICA

[75] Inventor: Donald E. Tunison, III, Champaign, Ill.

[73] Assignee: Cabot Corporation, Boston, Mass.

[21] Appl. No.: 103,269

[22] Filed: Aug. 6, 1993

Related U.S. Application Data

[63] Continuation-in-part of Ser. No. 614,782, Nov. 14, 1990, abandoned.

[51] Int. Cl.⁵ .............................................. C01B 33/18
[52] U.S. Cl. ..................................... 423/335; 423/336
[58] Field of Search ................................ 423/335, 336

[56] References Cited

U.S. PATENT DOCUMENTS

| 4,008,170 | 2/1977 | Allan | 252/194 |
| 4,048,290 | 9/1977 | Lee | 423/336 |
| 4,150,101 | 4/1979 | Schmidt et al. | 423/335 |

FOREIGN PATENT DOCUMENTS 63-23987  2/1988  Japan .

Primary Examiner—Olik Chaudhuri
Assistant Examiner—Ken Horton
Attorney, Agent, or Firm—Michelle B. Lando

[57] ABSTRACT

An improved process for uniformly distributing high levels of water in hydrophilic fumed silica by mixing with dry water.

11 Claims, No Drawings

PROCESS FOR UNIFORMLY MOISTURIZING FUMED SILICA

This is a continuation-in-part of copending application Ser. No. 07/614,782 filed on Nov. 14, 1990, now abandoned.

FIELD OF THE INVENTION

The present invention relates to a process for moisturizing fumed silica, and more particularly a process for uniformly dispersing water in fumed silica by the addition of dry water.

BACKGROUND OF THE INVENTION

Fumed silica is generally produced by the vapor phase hydrolysis of chlorosilanes, such as silicon tetrachloride, in a hydrogen/oxygen flame. The overall reaction is:

$$SiCl_4 + 2H_2 + O_2 \rightarrow SiO_2 + 4HCl$$

In this process, submicron sized molten spheres of silica are formed. These particles collide and fuse to form three dimensional branched, chain-like aggregates, of approximately 0.1 to 0.5 micron in length. Cooling takes place very quickly, limiting the particle growth and ensuring that the fumed silica is amorphous. These aggregates in turn become mechanically entangled to form agglomerates ranging in size from 0.5 to 44 micron (325 US mesh) in size. Generally, fumed silicas have B.E.T. (Brunauer Emmet Teller determined) surface areas ranging from about 50 to about 400 square meters per gram (sq. m/g) and bulk densities ranging from about 10 to about 50 g/l. Fumed silicas generally have very high purity, with total impurities, in many cases below 100 ppm.

Fumed silica produced by pyrogenic processes is characterized by having a high air content and a correspondingly low bulk density. The fumed silica is also hydrophilic, absorbing moisture from the atmosphere and thereby changing the flow and handling characteristics of the silica. Automated processes which utilize hydrophilic silica, require a uniformly moisturized fumed silica with predictable flow characteristics in order to diminish product variation and diminish maintenance and equipment costs. In certain applications such as in the production of 1 part RTV silicone rubber, water serves as catalyst in the curing stage. Non-Uniform distribution of water results in product variations. Uniform moisturization is also important to powder handling because it suppresses static charge buildup. Variation in moisture uniformity result in flow irregularities and contamination due to incomplete evacuation in equipment lines and reaction containers.

Fumed silica when exposed to high moisture environments and ambient temperatures (23° C.) shows a maximum of about 2% to 8% physical adsorption of water. Adsorption levels however, may rise further depending on the temperature, humidity and duration of storage. By combining water with fumed silica in high energy mixing, it has been shown that particulate silica has the potential for adsorbing about 80-90 weight percent water. See U.S. Pat. No. 4,008,170, Brunner German Pat. No. 1,467,023, and Schutte U.S. Pat. No. 3,393,155. The moisturized silica, commonly termed "dry water" has a variety of applications including a cooling source to minimize the risk of explosion in rocket fuels or in the extreme temperatures of outerspace where temperatures of −196° C. do not affect the flowability of the moisturized silica.

Fumed silicas can be treated with chemical agents to produce hydrophobic fumed silicas. Hydrophobic fumed silicas have utility in many applications. For example, hydrophobic fumed silicas may be used for reinforcement and rheology control fillers in RTV-2 (2 component, room temperature, vulcanized) type silicone compounds. Hydrophobic fumed silicas may also be used to provide corrosion resistance and hydrophobicity in coatings. Further, hydrophobic fumed silica acts as a free flow agent for powdered materials to prevent caking. For example, hydrophobic fumed silicas may be utilized in fire extinguishing powders, powdered polymers, pigments, toner, herbicides and insecticides. Still further, hydrophobic fumed silicas may be utilized to provide theology control and water resistance in polyester resins, in insulation coatings for moisture sensitive applications, for anti-settling purposes in aerosol paints, and for reinforcement and water repellency in dental compounds.

Hexamethyldisilazane (HMDS) may be used as a chemical treating agent to produce HMDS treated fumed silicas. A disadvantage of using HMDS is that HMDS produces ammonia as a by-product. The ammonia by-product is normally absorbed on the surface of the treated fumed silica. If such a product is put into part A of a RTV-2 system, the absorbed ammonia will cause Part A to have a high initial viscosity which increases during storage. Ammonia has been removed from treated silica by various methods, including heating.

Fumed silicas have also been treated with commonly known chemical agents such as dimethyldichlorosilane to produce a hydrophobic silica, and then combined with water, a wetting agent, and high shear mixing to produce an aqueous hydrophobic dispersion of silica. See U.S. Pat. No. 4,274,883. The references also discloses that a homogeneous dispersion of hydrophobic fumed silica was achieved without a wetting agent through prolonged mixing. The bulk density according to DIN 53194 was about 50 g/l.

The process for producing dry silica for use in a matting material, such as that used in polyurethane coatings having aerogel like structure including bulk densities of about 20 to 50 g/l and high macroporosity (DBP numbers up to 3.4 ml/g) is also known. See U.S. Pat. No. 4,150,101 where a pyrogenically derived fumed silica is combined with about 5 to 20% water and alternatively a pH adjustor followed by drying. The water is uniformly distributed in the silica by spraying the water into the stirred silica or by spraying the water into a fluidized flowing mass of silica by for example, a gravity pipe (fall tube). Steaming the water laden silica for a short period to enhance distribution of water is also disclosed. Applicant has determined however, that the application of steam to hydrophilic fumed silica produces a product in which the distribution of water is non-uniform.

Mixing carbon black with hydrophobic treated fumed silica has been used to improve the surface cure of vulcanizable compositions and reduce the "rub off" or removal of black from the surface material. See U.S. Pat. No. 4,221,693. Carbon black and the hydrophobic filler were mechanically agitated to obtain a homogeneous mixture. Hexamethyldisilazane was used to impart hydrophobic properties to fumed silica. While the vulcanizable compositions disclosed were cured by exposure to hot moist atmospheres such as steam, the hydrophobic fumed silica filler had to be free of moisture. A process which uniformly distributes moisture throughout hydrophilic fumed silica would be a desirable advancement in the art.

SUMMARY OF THE INVENTION

Accordingly, the present invention provides an improved process for treating fumed silica having a B.E.T surface area between about 30 m$^2$/g to 450 m$^2$/g by combining a quantity of a hydrophobic fumed silica with up to 95% by weight water and mechanically agitating the combination to form dry water. A quantity of dry water is calculated which is necessary to achieve a desired moisture level in a hydrophilic product silica. The calculated quantity of dry water is introduced into a quantity of hydrophilic fumed silica and agitated by mechanical means to effect uniform water distribution throughout said hydrophilic product silica.

DETAILED DESCRIPTION OF THE INVENTION

The process for producing dry water is known to those skilled in the art. See for example U.S. Pat. No. 4,008,170 which states that 75% moisturization occurred where 100 grams of fumed silica produced under the name CAB-O-SIL ® (Cab-O-Sil is a registered trademark of Cabot Corporation) having a particle size in the range from about 15 to 20 mu was placed in a container and 300 grams of water at room temperature was added slowly while stirring. After all the water was added the powdered product was tested for moisture content. Alternately, the water is combinable with fumed silica pretreated with a hydrophobicity agent such as hexamethyldisilazane. Other treating agents which render hydrophilic fumed silica hydrophobic known in the art include alkyl or aryl halosilanes, silanes, mixtures thereof, and siloxanes.

FINAL WEIGHT PERCENT MOISTURE

The final weight percent moisture content E of a hydrophilic fumed silica product dispersion can be calculated using the equation below if the following information is known:

I = The initial moisture content of a second quantity of hydrophilic fumed silica (or the fumed silica to be moisturized) in weight per cent.

SA = The initial silica surface area of a second quantity of hydrophilic fumed silica (or the fumed silica to be moisturized) in B.E.T m$^2$/g.

W = The amount of "dry" water used in grams/grams of a second quantity of hydrophilic silica.

M = The "dry" water weight per cent loss on drying.

E must be greater than I.

$$E = (-0.002372 \times SA) - (0.0000035 \times e^{(126.1 \times W \times M/SA)}) + (0.7921 \times I) + (0.948 \times W \times M)$$

wherein e = 2.71828.

Alternately, for a desired weight percent moisture content E, a quantity of dry water necessary to achieve such moisturization may be calculated. The weight percent moisture content of hydrophilic fumed silica treated with dry water is calculated below for the Examples presented. Moisture adsorption by weight percent of less than about 40% are taught by the present invention for fumed silica with a surface area from 30 m$^2$/g to 450 m$^2$/g B.E.T..

UNIFORMITY DETERMINATION

A uniform distribution of moisture for a given quantity of fumed silica is defined to be equal to or within a 95% probability of the level of distribution of water in pyrogenically formed fumed silica as analyzed after calcination. Uniformity is determined herein by taking multiple samples, testing for loss on drying, and applying a variability analysis: the F test, in accordance with well established principles of statistics to compare the variability of the loss on drying for moisturized and normal/unmoisturized silica.

The product in each of the below examples was sampled in five different locations within the sample container. Each sample was tested for moisture and a standard deviation of sigma was calculated for the test results. The sigma of the sample was then compared with sigma of the test for normal, unmoisturized silica via the F test. Where the probability that the moisturized silica is less uniform than the unmoisturized silica is less than 5%, a uniform distribution is shown.

SAMPLE PREPARATION

A sample of fumed silica is selected on the basis of known thixotropic properties. A quantity of dry water is calculated for a desired level of fumed silica water adsorption based on nominal silica properties and known moisture content of dry water. For example, nominal silica properties are 200 m$^2$/g and 0.5% water for the "CAB-O-SIL M-5" fumed silica, 50 m$^2$/g and 0.3% water for the DEGUSSA ® OX-50 fumed silica, and 375 m$^2$/g and 1.0% water for the "CAB-O-SIL EH-5" fumed silica.

One pound of the selected fumed silica is placed in a storage container with the calculated amount of dry water and sealed. The bag is manually agitated for approximately 20 to 30 seconds. The bag or container is manually agitated by physically shaking the bag or container. In the alternative, conventional means known to those skilled in the art may be used for mechanically agitating the fumed silica and dry water. Conventional diaphragm or transfer pumps have also been found suitable to circulate the fumed silica and dry water, such as that available from Wilden Pump & Engineering Co. Samples were then taken at the time intervals of approximately 15 minutes, 2 hours, and 24 hours after the low shear mixing was concluded.

EXAMPLE 1

About 454 grams of CAB-O-SIL ® M-5 fumed silica having an initial moisture content of 0.42% by weight and a B.E.T. surface area of 212 m$^2$/g were placed in a storage container and mechanically agitated with 9.65 grams of "dry water" having an initial moisture content of 72.1% by weight for 15 to 20 seconds. The resulting silica was sampled 15 minutes later and analyzed according to the following procedure.

The moisturized fumed silica product was sampled at the middle of the top, the right side, the middle of the bottom, the left side, and the center of the container. Moisture analysis was performed by subjecting the preweighed samples to drying, such as in an oven at 105° C. The dried samples were weighed in their heated condition. Values of 1.28, 1.26, 1.24, 1.17, and 1.28% by weight were recorded. The average loss on drying was 1.25% by weight with a sigma of 0.0456% by weight.

The sigma for loss on drying test with 200 m²/g silica is 0.079% for a study of 39 tests with one sample. Since the sigma of the test is greater than the sigma of the sample, the F value is calculated as:

$$F = (\text{sigma of the test})^2/(\text{sigma of the sample})^2 = 3.00$$

For the samples to be the same in terms of variability at a 95% confidence level, the F value must be less than the 4.46 in the F distribution tales for $v_1 = 39$ and a $v_2 = 5$. Since the F for the samples is less than the table value, the probability that the moisturized silica is less uniform than the unmoisturized silica is less than 5%.

EXAMPLE 2

The process of Example 1 was repeated with the exception that 16.3 grams of "dry water" were introduced instead of 9.65 grams. The resulting silica had a moisture content of 2.53% by weight.

EXAMPLE 3

The process of Example 1 was repeated with the exception that 60.7 grams of "dry water" instead of 9.65 grams were introduced. The resulting silica had a moisture content of 8.60% by weight.

EXAMPLE 4

About 454 grams of "Aerosol OX-50" fumed silica having an initial moisture content of 0.30% by weight and a B.E.T. surface area of 45 m²/g were placed in a storage container and mechanically agitated with 2.53 grams of "dry water" having an initial moisture content of 72.1% by weight for 15 to 20 seconds. The resulting silica was sampled 15 minutes later and had a moisture content of 0.45% by weight.

EXAMPLE 5

The process of Example 4 was repeated with the exception that 13.63 grams of "dry water" instead of 2.53 grams were introduced. The resulting silica had a moisture content of 2.14% by weight.

EXAMPLE 6

About 454 grams of "CAB-O-SIL EH-5" fumed silica having an initial moisture content of 4.66% by weight and a B.E.T. surface area of 358 m²/g were placed in a storage container and blended with 19.72 grams of dry water having an initial moisture content of 72.1% by weight by mechanically agitating for 15 to 20 seconds. The resulting silica was sampled 15 minutes later and had a moisture content of 6.07% by weight.

EXAMPLE 7

The process of Example 6 was repeated with the exception that 33.85 grams of dry water instead of 19.72 grams were introduced. The moisture content of the resulting silica product was determined according to the procedures of Example 1. The product loss on dryings were 7.72, 7.87, 7.84, 7.53, and 8.17% by weight. The average was 7.83% by weight with a sigma of 0.234% by weight. The sigma for the loss on drying test with "EH-5" is 0.454 for a study of 39 tests with one sample. The sigma of the test is greater than the sigma of the sample; the F value is therefore calculated as:

$$F = (\text{sigma of the test})^2/(\text{sigma of the sample})^2 = 3.76$$

For the samples to be the same in terms of variability at a 95% confidence level, the F value must be less than the 4.46 in the F distribution tables for $v_1 = 39$ and a $v_2 = 5$. Since the F for the samples is less than the table value, the probability that the moisturized silica is less uniform than the unmoisturized silica is less than 5%.

EXAMPLE 8

The process of Example 6 was repeated with the exception that 140 grams of "dry water" instead of 19.72 grams were introduced. The resulting silica had a moisture content of 20.76% by weight.

The Examples presented above are not intended to limit the scope of the invention as those skilled in the art will readily appreciate alternate embodiments. For example, the selection of samples for analysis may be from alternate locations in the mixing container. Similarly, the means for drying the moisturized silica and mechanical agitation may vary as known in the art.

What is claimed is:

1. A process for treating fumed silica having a B.E.T. surface area between about 30 m²/g to 450 m²/g comprising:
   converting a first quantity of hydrophilic fumed silica to hydrophobic fumed silica by the addition of a treating agent,
   combining a quantity of said hydrophobic fumed silica with up to 95% by weight water and mechanically agitating said combination of said hydrophobic fumed silica and water to form dry water,
   calculating a quantity of said dry water necessary to achieve a desired moisture level in a second quantity of hydrophilic fumed silica,
   introducing said calculated quantity of said dry water to said second quantity of hydrophilic fumed silica to form a hydrophilic fumed silica product dispersion and agitating by mechanical means to effect uniform water distribution throughout said dispersion.

2. The process according to claim 1 wherein said first quantity of hydrophilic fumed silica is pyrogenically generated by the hydrolytic conversion of halogenated silanes.

3. The process according to claim 2 wherein said dry water is up to about 72% by weight water.

4. The process according to claim 2 wherein said treating agent is hexamethyldisilazane.

5. The process according to claim 2 wherein said treating agent is dimethyldichlorosilane.

6. The process according to claim 4 wherein said first hydrophilic fumed silica has an apparent density of less than 60 g/l and a pH less than 11.0.

7. The process according to claim 1 wherein said mechanical agitation generates low shear agitation.

8. The process according to claim 4 wherein said hydrophilic fumed silica product dispersion contains less than 40% by weight water.

9. The process according to claim 8 wherein said dispersion contains about 20% water by weight.

10. The process according to claim 8 wherein said hydrophobic fumed silica has B.E.T. surface area of from about 200 to 350 m²/g.

11. A process for treating fumed silica having a B.E.T. surface area between about 50 m²/g to 450 m²/g comprising:
    combining a quantity of a hydrophobic fumed silica with up to 95% by weight water and agitating said combination of said hydrophobic fumed silica and water to form dry water;

calculating a quantity of said dry water necessary to achieve a desired moisture level in a quantity of hydrophilic fumed silica; and introducing said calculated quantity of said dry water to said quantity of hydrophilic fumed silica to form a hydrophilic fumed silica dispersion and agitating to effect uniform water distribution throughout said dispersion.

* * * * *